(12) United States Patent
Mitsutani et al.

(10) Patent No.: US 6,466,875 B1
(45) Date of Patent: Oct. 15, 2002

(54) METHOD OF ESTIMATING GEL CONTENT OF PROPYLENE BLOCK COPOLYMER

(75) Inventors: Kenji Mitsutani, Okayama (JP); Glen H. Ko, Cambridge, MA (US); Kiyoshi Yukawa; Fuminao Watanabe, both of Okayama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/423,602

(22) PCT Filed: Mar. 12, 1999

(86) PCT No.: PCT/JP99/01216

§ 371 (c)(1),
(2), (4) Date: Dec. 28, 1999

(87) PCT Pub. No.: WO99/46311

PCT Pub. Date: Sep. 16, 1999

(30) Foreign Application Priority Data

Mar. 12, 1998 (JP) .............................................. 10-60791

(51) Int. Cl.$^7$ .......................... G06F 19/00; G01N 31/00
(52) U.S. Cl. ............................................ 702/22; 703/2
(58) Field of Search .............................. 702/22, 23, 25, 702/30; 525/316, 53, 191; 703/2

(56) References Cited

U.S. PATENT DOCUMENTS

| 4,380,608 A | | 4/1983 | Hasuo et al. |
| 4,771,103 A | | 9/1988 | Chiba et al. |
| 5,260,882 A | * | 11/1993 | Blanco et al. ................. 703/12 |
| 5,461,115 A | | 10/1995 | Oka |
| 5,475,067 A | * | 12/1995 | Schiffino ..................... 526/351 |
| 5,687,090 A | * | 11/1997 | Chen et al. .................. 700/269 |
| 6,064,945 A | * | 5/2000 | Gorenstein et al. ........... 702/23 |
| 6,093,211 A | * | 7/2000 | Hamielec et al. ........... 700/269 |

* cited by examiner

*Primary Examiner*—Patrick Assouad
(74) *Attorney, Agent, or Firm*—Oblon, Spivak, McClelland, Maier & Neustadt, P.C.

(57) ABSTRACT

A concentration distribution of a rubber component in block copolymer particles is computed based on the operating conditions of a polymerization apparatus, a growth model equation of polymer particles on a solid catalyst component, and a residence time distribution of the particles in each of a homopolymerization stage and a copolymerization stage, and the gel content of the block copolymer is estimated based on the computation. The gel content of a propylene block copolymer can thereby be estimated precisely.

3 Claims, 7 Drawing Sheets

FIG. 1

PROPORTION (wt%) OF PARTICLES HAVING COPOLYMER
CONTENT OF 50 wt% OR MORE IN BLOCK COPOLYMER

METHOD OF ESTIMATING GEL CONTENT OF PROPYLENE BLOCK COPOLYMER

TECHNICAL FIELD

This invention relates to a method for precisely estimating the gel content, one of important characteristics, of a propylene block copolymer based on designed conditions of manufacture without involving actual production of the copolymer.

BACKGROUND ART

A block copolymer, which is one of typical polypropylene products, has been of wide use for its excellent impact resistance. A block copolymer is manufactured through two-stage polymerization; former stage polymerization and latter stage polymerization. In the former stage polymerization, propylene is polymerized substantially alone in the presence of a solid catalyst component to produce polypropylene particles having the solid catalyst component inside. In the latter stage polymerization, propylene is copolymerized with other α-olefins, usually ethylene, in the presence of the polypropylene particles. The copolymerization is carried out by the catalytic action of the solid catalyst component contained in the polypropylene particles produced in the former stage polymerization. Accordingly, the individual block copolymer particles are made up the homopolymer portion produced by the former stage polymerization and the copolymer portion produced by the latter stage polymerization.

A gel content is one of the important characteristics of a propylene block copolymer. The term "gel" denotes a component which precipitates like foreign matter when a block copolymer is melt-kneaded and molded into a film. The gel is considered to be the portion that has not been melted to become uniform by the melt kneading.

Gel not only impairs the appearance of the product produced from a block copolymer but acts as a stress concentrator to reduce the product strength. Hence it has been demanded to minimize gel formation in the manufacture of propylene block copolymers.

However, no reports has been made to elucidate the mechanism of gel formation. The amount of gel produced under designed polymerization conditions could be qualitatively predicted by experience but not quantitatively. It has therefore been a conventional way in the practice that production conditions are decided so as to result in a desired gel content after a process of trial and error comprising confirming gel contents through experimental sample preparation, altering conditions of experimental preparation, and repeating sample preparation. Because this way of decision requires a great deal of time and labor, improvement has been awaited. Accordingly, this invention is to provide a method for quantitatively estimating a gel content of a propylene block copolymer based on assumed production conditions.

DISCLOSURE OF THE INVENTION

The present inventors have investigated the mechanism of gel formation and found as a result that gel has its origin in the copolymer portion of block copolymer particles, that is, those particles having a rubber component portion in a large proportion. Therefore, the amount of gel produced will be estimated only if the concentration of the rubber component of individual block copolymer particles can be estimated from a polymerization apparatus.

Propylene block copolymer particles are produced by polymerization and copolymerization on a solid catalyst component, and the proportions of the homopolymer and of the copolymer in the individual particles depend on the operating conditions of the polymerization apparatus and the residence times of the polymer particles in the former and the latter stages of polymerization.

Therefore, the gel content of a propylene block copolymer can be estimated by computing the rubber component concentration distribution in the block copolymer particles to be produced based on the operating conditions of a polymerization apparatus, a growth model equation representing the state of polymer particles growing on a solid catalyst component, and a residence time distribution of polymer particles in former and latter polymerization stages.

BEST MODES FOR CARRYING OUT THE INVENTION

The present invention will be described below in detail.

The basis of the invention lies in the inventors' new findings that gel has its origin in the copolymer portion, i.e., block copolymer particles having a rubber component in a large proportion. This fact is easily confirmed by observing gel development in a molten and kneaded mixture of copolymer component-free polypropylene and a polypropylene block copolymer which has been prepared by a batch reaction system comprising supplying a solid catalyst component and propylene to a polymerization reactor to produce a homopolymer and then supplying propylene and ethylene to the reactor to form an ethylene-propylene copolymer.

Figure 1:
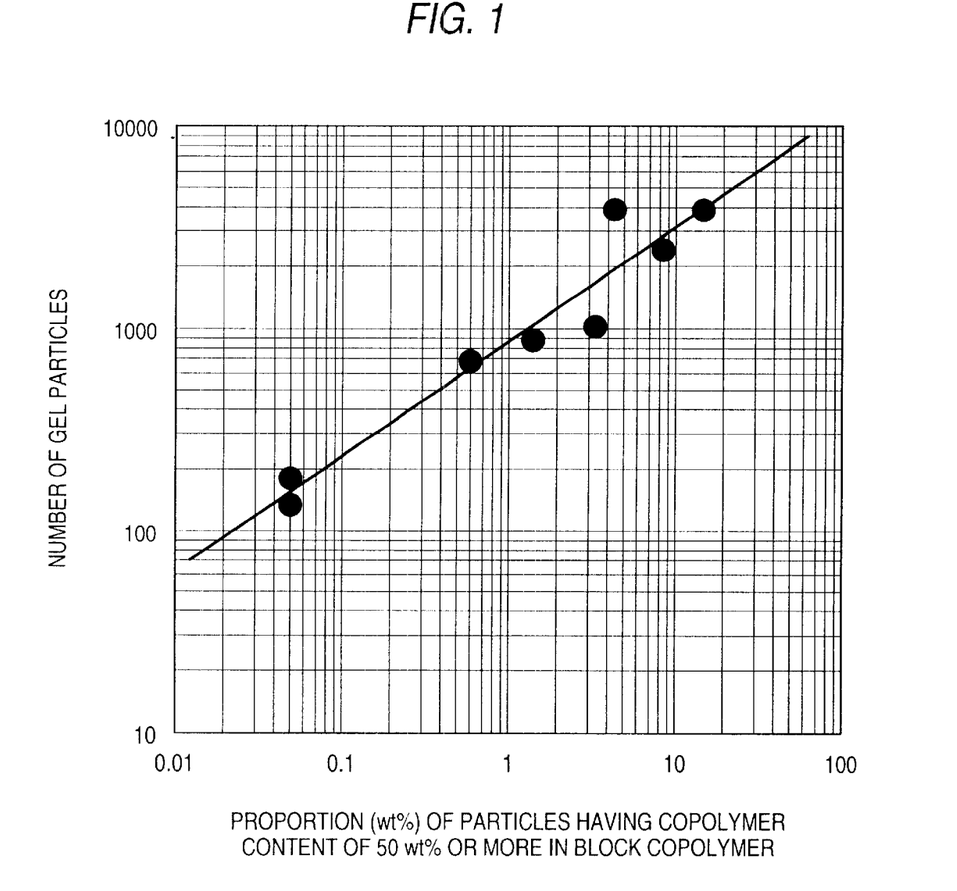
FIG. 1 is a graph showing an example of the relationship between the proportion of a copolymer portion in a block copolymer and the number of gel particles per 250 $cm^2$.

It is safe to assume that all the particles of a propylene block copolymer obtained in a batch system have the same proportion of a copolymer portion. When a small amount of such a block copolymer is mixed with polypropylene containing no copolymer portion, followed by melt-kneading, observation on gel development reveals that: gel hardly develops where the block copolymer has a small proportion of the copolymer portion, but gel develops where the block copolymer has a large proportion of the copolymer portion, with the amount of the gel developed increasing in proportion to the amount of the block copolymer added. According to the inventors' study, the critical point of whether or not block copolymer particles develop gel is at an about 50% by weight in terms of proportion of the copolymer portion in the block copolymer particles. Block copolymer particles having a larger proportion of the copolymer portion than about 50 wt % develop gel with virtual certainty. On the other hand, block copolymer particles with a smaller proportion of the copolymer portion has a considerably small possibility of gel development. For example, FIG. 1 is a diagram showing an example of the relationship between the proportion of block copolymer particles having a copolymer content of 50 wt % or more and the amount of gel developed.

While the details of why particles having a copolymer content of more than 50 wt % develop gel are unclear, it is believed that phase conversion may occur when the copolymer content reaches about 50 wt %. The inventors think that the polymer particles comprise the homopolymer dotted with the copolymer to make a sea-island structure as long as the copolymer content is less than 50 wt %, but upon the copolymer content exceeding 50 wt %, the phase is changed to a sea-island structure in which the homopolymer dots the copolymer. It is also thought that, when the polymer particles are melt-kneaded, the particles having the latter structure hardly dissolve in the melt comprising the former structure in a major proportion and therefore precipitate as gel.

Anyway, now that polymer particles having a copolymer content exceeding about 50 wt % cause gel formation, it is apparent that the gel development state can be forecast by calculating the proportion of such causative particles in the total polymer particles withdrawn from a polymerization apparatus.

Production of a block copolymer by a continuous polymerization process involves gel formation in spite of the small copolymer content in the whole block copolymer. This is because the proportion of the copolymer portion varies among the individual polymer particles, and some of the polymer particles have that proportion reaching about 50 wt % or higher. The variation in the proportion of the copolymer portion among individual polymer particles is attributed to variation in residence time of the individual polymer particles in each of the former and latter polymerization stages. In other words, the homopolymer content and the copolymer content in the individual polymer particles are considered dependent basically on the residence times in the former and latter polymerization stages. Since a continuous polymerization process inevitably involves a distribution of residence time among polymer particles, it is unavoidable for the proportion of the copolymer portion in polymer particles to have a distribution. In the invention, the gel content of a block copolymer which will be produced is estimated by computing a distribution of copolymer concentration in polymer particles based on the operating conditions of a polymerization apparatus and the like from the standpoint of probability.

A distribution of copolymer concentration in polymer particles is considered to be decided by the distribution of residence times of the particles in each of the former and latter polymerization stages and the rate of attenuation of catalytic activity. Where polymer particles are subjected to classification when transferred from the former to the latter stage, the classification also has great influences on the residence time distribution. In this case, the size distribution of the charged solid catalyst component should also be taken into consideration for the following reason. It is very likely that polymer particles containing a large-diameter solid catalyst component and those containing a small-diameter solid catalyst component behave similarly in classification as long as they are equal in size, but they are greatly different in polymer content. In the invention, therefore, the concentration distribution of the copolymer portion in polymer particles to be produced is computed on the basis of probability based on a growth model formula of polymer particles on a solid catalyst component, which is indicative of the activity attenuation state of the solid catalyst component, a residence time distribution of polymer particles in each of former and latter polymerization stages, and the operating conditions of a polymerization apparatus.

While the propylene block copolymer production process to which the method of gel content estimation according to the invention is applied comprises a former polymerization stage where propylene is homopolymerized and a latter polymerization stage where propylene and other α-olefins, usually ethylene, are copolymerized, various modifications can be added thereto in specific embodiments of the invention. For example, a classification stage can be provided between the former and latter stages; each of the former and latter stages can be carried out in multi-stages; and the polymerization apparatus includes not only a perfect mixing tank reactor but a loop reactor and a gas phase reactor.

Figure 2:
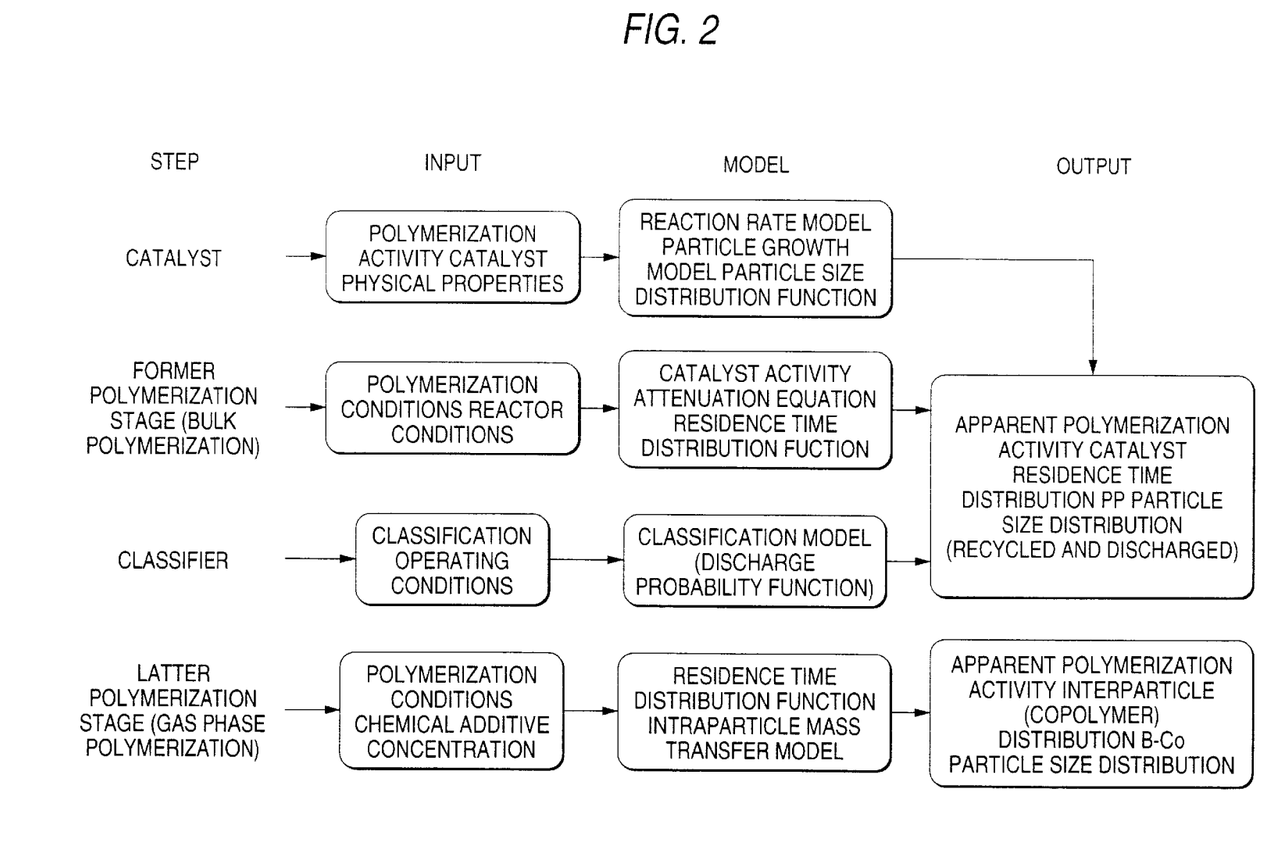
FIG. 2 is a diagram showing the outline for gel content estimation.

The outline of the gel content estimation method according to the invention is shown in FIG. 2. The input conditions are as follows.

Catalyst:
  Polymerizing activity (reaction rate data)
  Physical properties (mean particle size and particle size distribution)
Former Polymerization:
  Polymerization conditions (temperature, pressure, residence time, and gas composition)
  Reactor (capacity and reaction rate)
Classifier:
  Operating conditions (countercurrent flow rate and discharge flow rate) (classifier structure) (concentrations of chemical additives)

The computing procedure for every processing unit should be such that a probability distribution may be calculated by using heterogical processing variables and is arbitrarily selected according to necessity from a Monte Carlo method, a population balance method, a probability distribution function calculation method, and the like. By the computing method a residence time distribution can be estimated for each processing unit.

Figure 3:
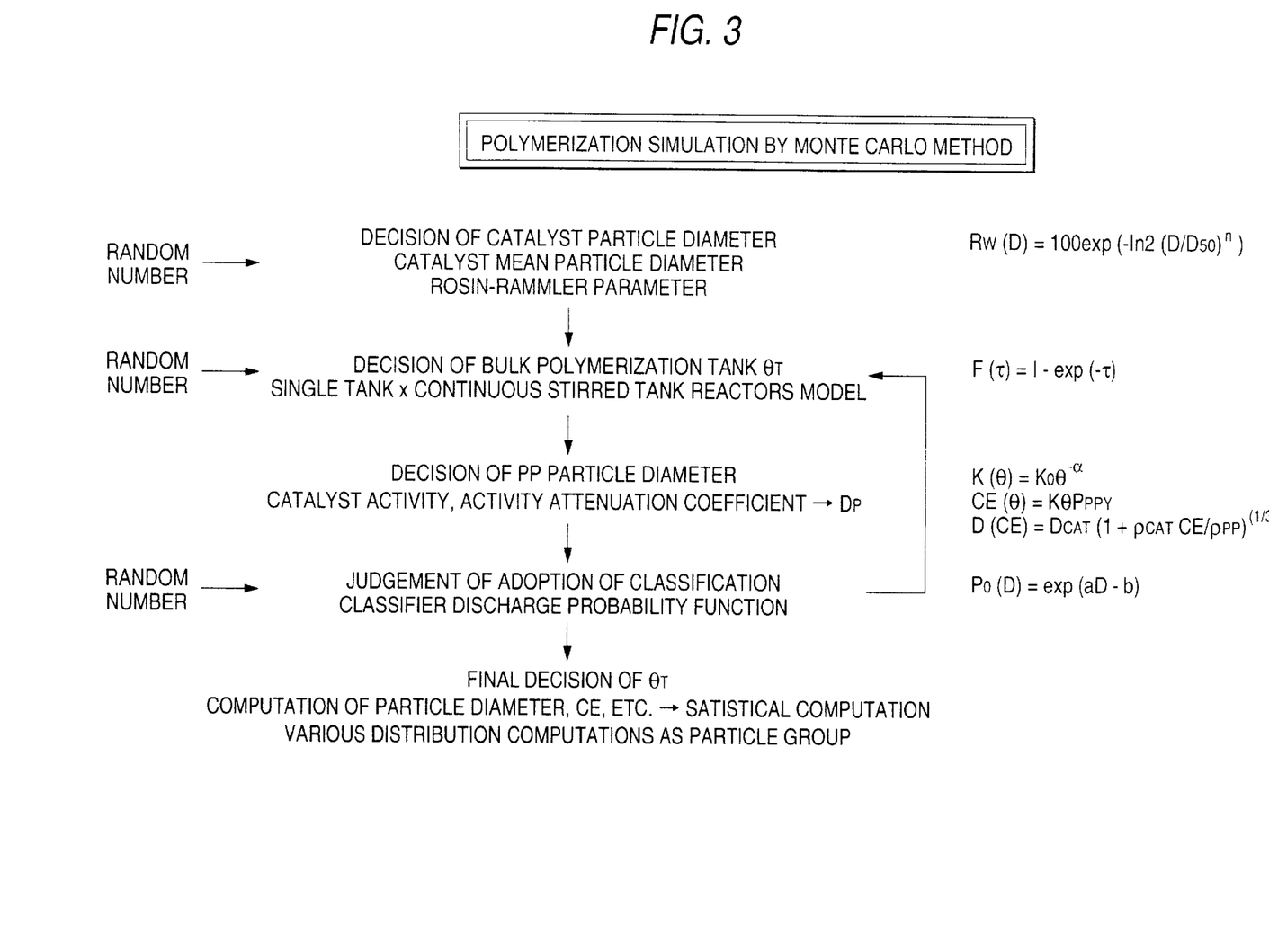
FIG. 3 shows an example of computation procedure.

An example of the computing procedure is described in FIG. 3. Computations themselves can be carried out by referring to the following literature.

(1) Debling, J. A., "Modeling Particle Growth and Morphology of Impact Polypropylene Produced in the Gas Phase", Ph. D. Thesis, University of Wisconsin (1997);

(2) Nishio, T., T. Nomura, T. Yokoi, H. Iwai, and N. Kawamura, "Development of Super Olefin Bumpers for Automobiles", presented at SAE Automotive Body Panel and Bumber System Materials and Design, Detroit (October, 1992);

(3) Zacca, J., J. A. Debling, and W. H. Ray, "Reactor Residence Time Distribution Effects on the Multistage Polymerization of Olefin", 5th DECHEMA Workshop, Berlin (1995); and (4) Kang, S., P. Yoon, and W. K. Lee, "Steady state particle growing with segregation in fluidized bed granular", J. Chem. Eng. Japan, vol. 22, p. 272 (1989).

Models intrinsic to each processing unit include a catalyst particle diameter model, a residence time distribution model in a polymerization reactor, a classification model, a polymerization kinetics model, a particle growth model, and an intraparticle mass transfer model. To obtain a copolymer content distribution among polymer particles is to obtain a residence time of the homopolymer and of the copolymer in each reaction zone for every charged catalyst particle. In the following each of these models will be explained in detail.

Catalyst Particle Diameter Distribution Model:

In general, a particle diameter distribution of a Ziegler-Natta catalyst is well expressed by a Rosin-Rammler distribution shown below.

$$R(Dc) = \exp\left(-\ln(2) \cdot \left(\frac{D_c}{D_{c,50}}\right)^n\right) \quad \text{Equation 1}$$

wherein R(Dc) represents a weight cumulative distribution relating to catalyst particle diameter; Dc represents a catalyst diameter; and $D_{c,50}$ represents a 50 wt % mean particle diameter of catalyst.

The above equation expressing a weight distribution of particles, it is necessary to convert the equation to a number distribution for carrying out computations noting every particle diameter.

Residence Time Distribution Model:

Polymer particles have a residence time distribution in the former and latter polymerization stages. Where the distribution is known by a step response method or other methods of measurement, it can be used as expressed numerically. Where stirring is regarded to be performed ideally, the following continuous stirred tank reactors model can be applied.

$$F(\tau) = 1 - \exp(-\tau) \quad \text{Equation 2}$$

$$\tau = \frac{\theta}{\bar{\theta}}$$

wherein F(τ) represents a discharge cumulative distribution function; θ represents a residence time; and θ0 bar represents an average residence time.

Classification Model:

Where a classification stage is provided between the former and latter polymerization stages, a classification model represented by the following equation is used to express control on particle diameter-dependent residence time. The particles that are not discharged from the lower part of a classifier are recycled to the former polymerization stage. The following equation represents the probability of particles being discharged from the lower part of a classifier for each particle diameter, taking the same functional form as the "size selection factor" described in the above literature (4).

$$P(D_p) = \exp(aD_p - b) \quad \text{Equation 3}$$

wherein $P(D_p)$ represents a discharge probability function; $D_p$ represents a particle diameter of the polymer fed to a classifier; and a and b each represent a parameter dependent on the classifier or the operational conditions thereof.

Polymerization Kinetics Model:

In general, the reaction yield in Ziegler polymerization can be expressed in terms of catalyst efficiency, hereinafter "CE". CE is defined as the number of grams of a polymer produced per gram of a catalyst as expressed by the following equations. This definition can apply to both the homopolymer and the copolymer in the production of a block copolymer.

$$CE_{Homo}(g/g) = \text{weight of homopolymer (g)/weight of catalyst (g)} \quad \text{Equation 4}$$

$$CE_{EPR}(g/g) = \text{weight of copolymer (g)/weight of catalyst (g)} \quad \text{Equation 5}$$

On the other hand, CE in the polymerization reactions for the homopolymer and for the copolymer can be calculated according to the following equations.

$$CE_{Homo} = S_0 \theta K_{H.\ inst} P_H \cdot d\theta \quad \text{Equation 6}$$

$$CE_{EPR} = S_0 \theta K_{E.\ inst} P_E \cdot d\theta \quad \text{Equation 7}$$

wherein $K_{H.inst}$ and $K_{E.inst}$ represent an instantaneous polymerization activity for homopolymerization and for copolymerization, respectively; and $P_H$ and $P_E$ represent a monomer pressure in homopolymerization and copolymerization, respectively.

The instantaneous polymerization activity can be expressed as follows using a rate equation of pseudo first order reaction.

$$K_{H.\ inst} = K_{H.\ o} \exp(-k_{H.\ d} \cdot \theta_H) \quad \text{Equation 8}$$

$$K_{H.\ inst} = K_{E.\ o} \exp(-k_{HE.\ d} \cdot \theta_H - k_{E.\ d} \cdot \theta_E) \quad \text{Equation 9}$$

wherein $K_{H.o}$ and $K_{E.o}$ each represent an instantaneous activity constant; $k_{H.d}$, $k_{HE.d}$, and $k_{E.d}$ each represent a polymerization time activity attenuation coefficient; and $\theta_H$ and $\theta_E$ represent a residence time of a homopolymer and of a copolymer, respectively.

The CE in homopolymerization and copolymerization are decided by these polymerization kinetics equations given polymerization conditions and polymerization times in the homopolymerization and the copolymerization.

Particle Growth Model:

$$D_{HOmO} = D_c \left(1 + \frac{\rho_{cat}}{\rho_{pp}} CE_{HOmO}\right)^{1/3} \quad \text{Equation 10}$$

$$D_{B-CO} = D_C \left(1 + \frac{\rho_{cat}}{\rho_{pp}} (CE_{HOmO} + CE_{EPR})\right)^{1/3} \quad \text{Equation 11}$$

wherein $D_{Homo}$ and $D_{B-co}$ represent the particle diameter of a homopolymer and of a block copolymer, respectively; and $\rho_{cat}$ and $\rho_{pp}$ represent the density of a catalyst and of a polymer, respectively.

Intraparticle Reaction Model of Chemical Additive:

Where part of catalyst activity is attenuated or deactivated by feed of a chemical additive in copolymerization, an intraparticle mass transfer model shown below is used. This model is led from the model found in the following literature.

$$\theta_{EPR} = \frac{\rho_A R^2}{6 D_e C_{Ag}} (1 - 3G^2 + 2G^3) \quad \text{Equation 12}$$

wherein $\theta_{EPR}$ represents a copolymerization time; $\rho_A$ represents the intraparticle density of an additive; $D_e$ represents an effective diffusion coefficient of the additive; $C_{Ag}$ represents the concentration of an additive; R represents the radius of the particle; and G represents an effective activity ratio (core ratio) of the particle.

For the calculations of polymerization activity, the effective activity ratios of the particles are multiplied together.

Literature: "Chemical Reaction Engineering" 2nd ed., Octave Levenspiel, John Wiley & Sons, Inc. (1972)

Intraparticle Mass Transfer Rate Determination Model:

While polymerization proceeds in a solid containing a catalyst component, the monomer component penetrates the particle surface to produce a polymer. Where the intraparticle diffusion of the monomer is larger than the amount of the monomer consumed by the polymerization reaction, the overall catalyst efficiency reduces even though there is an effective active catalyst component in the particle. The well-known Thiele modulus shown below can be used as a model expressing such influences.

$$mL = \frac{R}{3}\sqrt{\frac{k}{D_{AB}}} \cdot \eta = \frac{\tanh mL}{mL} \quad \text{Equation 13}$$

wherein $D_{AB}$ represents a diffusion coefficient of a monomer; k represents a rate constant of polymerization reaction; and η represents an effectiveness factor of catalyst of the particle. For the calculations of polymerization activity, the effectiveness factors of catalyst of the particles are multiplied together.

The above-described models are worked out based on the catalyst particle diameter to calculate the respective residence time of the homopolymer and of the copolymer per unit polymer particle or the respective CE. The copolymer content can be calculated according to the following formula.

$$[\text{Copolymer}] \text{ (wt \%)} = \frac{CE_{EPR}}{CE_{Homo} + CE_{EPR}} \times 100 \quad \text{Equation 14}$$

Figure 4:
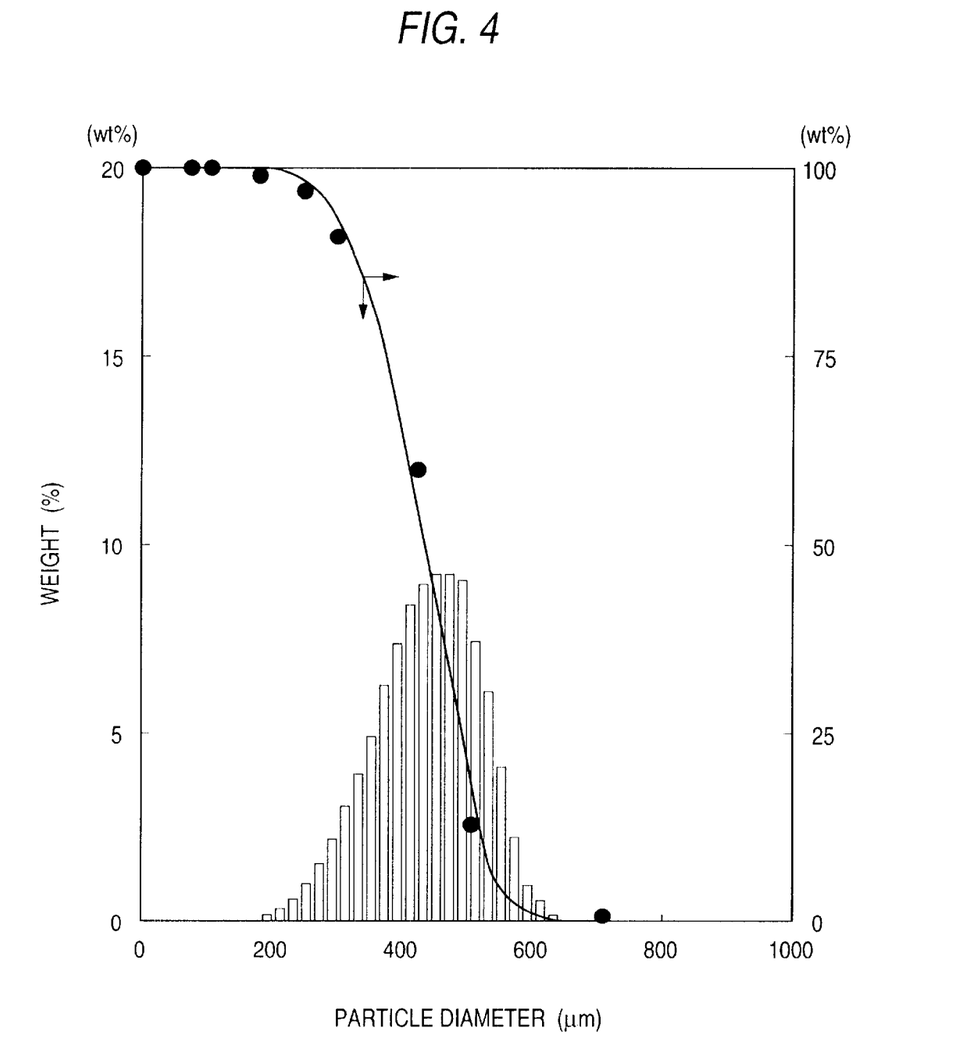
FIG. 4 shows an example of a calculated (bar graph) and a found (cumulative weight curve) particle size distribution of polymer particles in a former polymerization stage.
Figure 5:
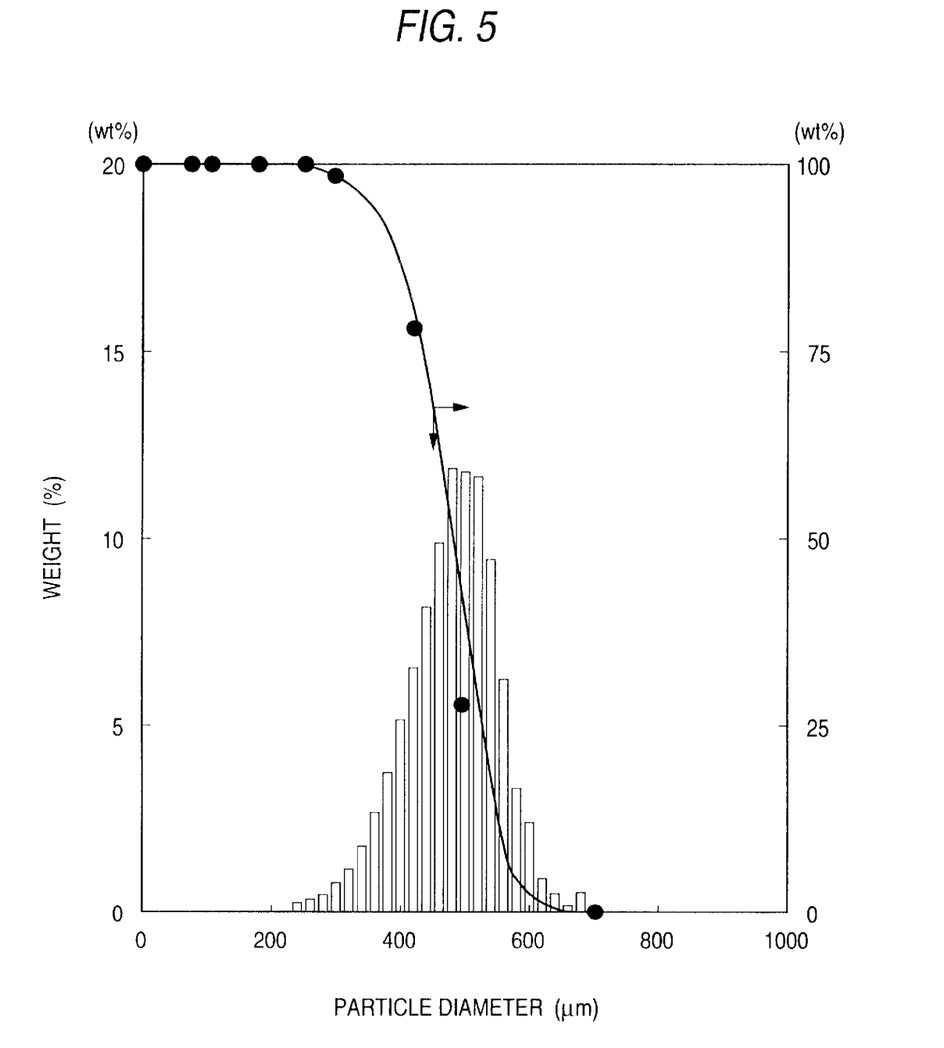
FIG. 5 shows an example of a calculated (bar graph) and a found (cumulative weight curve) particle size distribution of polymer particles discharged from a classifier.
Figure 6:
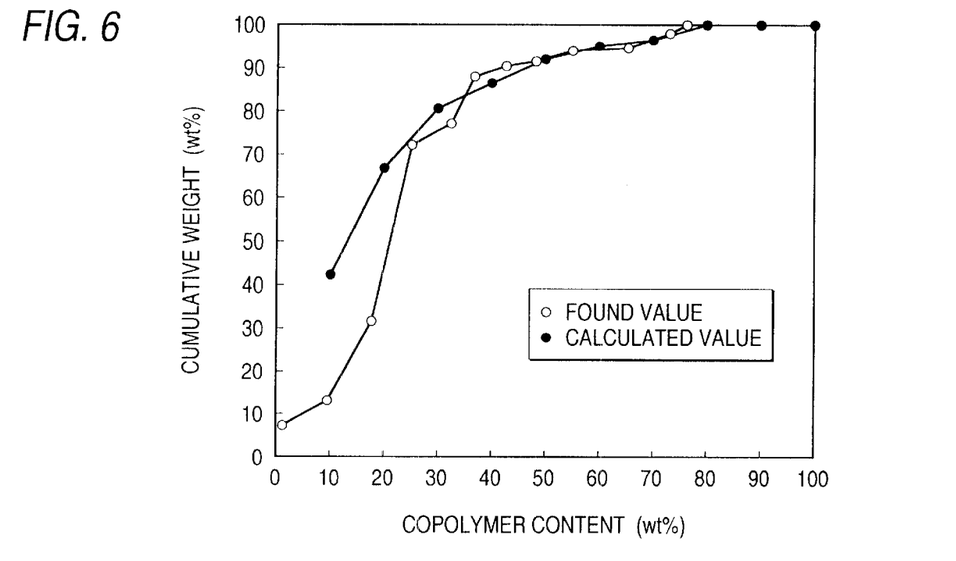
FIG. 6 depicts an example of a calculated and a found distribution (cumulative weight curve) of copolymer content in block copolymer particles having an average copolymer content of 18.5%, in which example a classifier was not used, nor was added a chemical additive.
Figure 7:
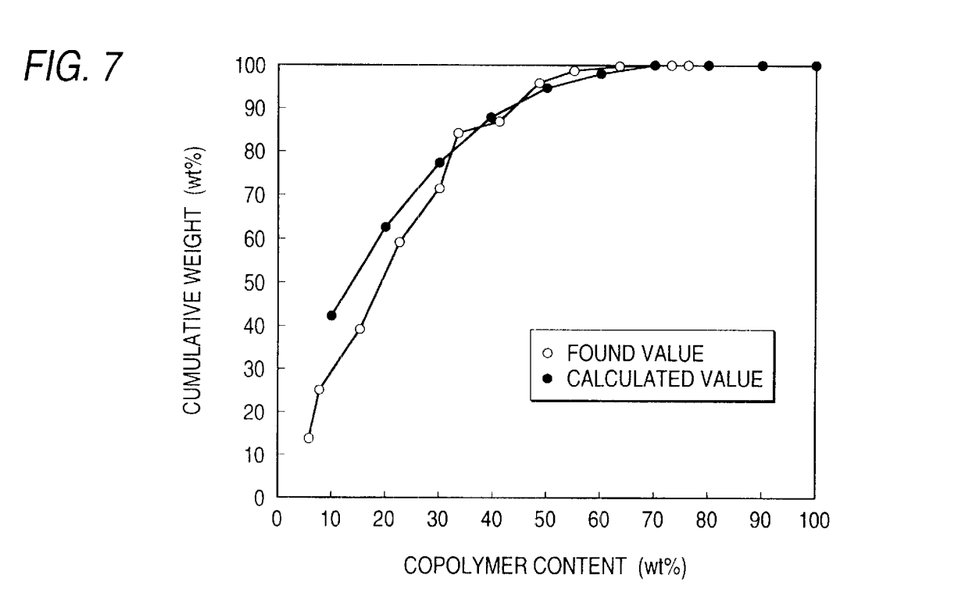
FIG. 7 is the same as FIG. 6, except that a chemical additive was fed (a classifier was not used).
Figure 8:
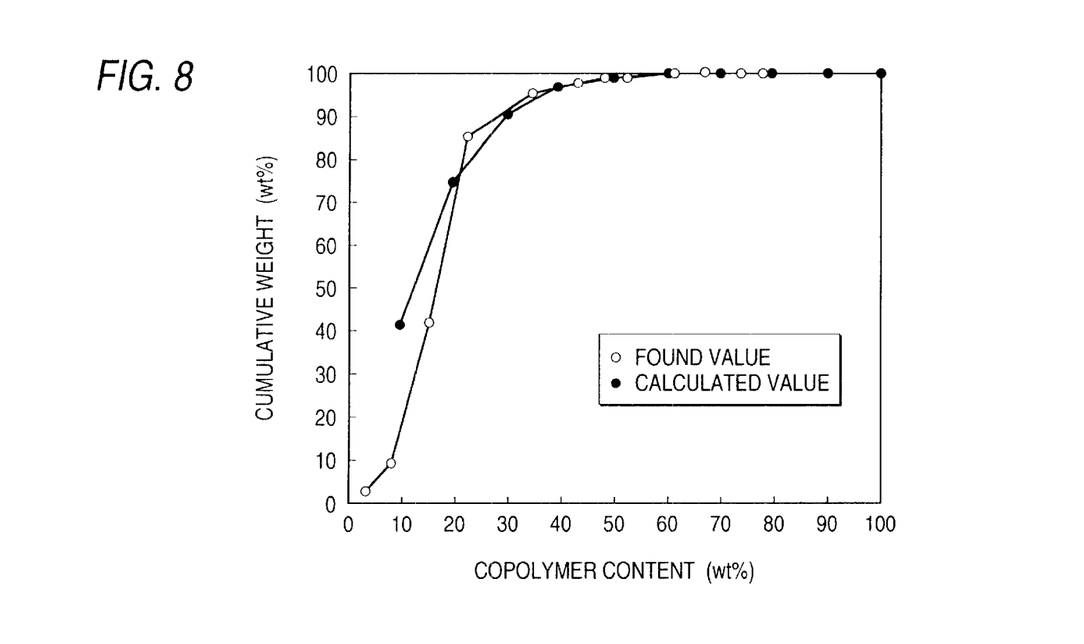
FIG. 8 is the same as FIG. 6, except a classifier was used (a chemical additive was not fed).
Figure 9:
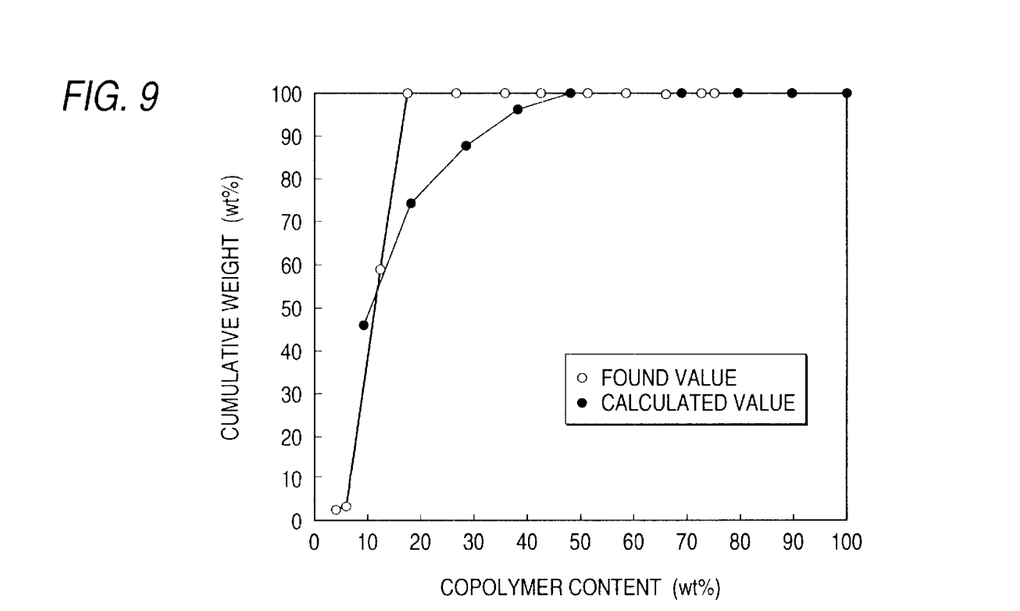
FIG. 9 is the same as FIG. 6, except that a classifier was used, and a chemical additive was fed.

The particle size distribution of block copolymer particles and the concentration distribution of the rubber component in the block copolymer can be computed from the above-described equations. FIG. 4 shows an example of a thus computed size distribution (bar graph) and a found size distribution (cumulative distribution curve) in a former polymerization stage. FIG. 5 similarly shows the results of particles discharged from a classifier. FIGS. 6 through 9 each depict a distribution of rubber component's concentration in a block copolymer, wherein FIG. 6 shows the results of an example using neither classifier nor chemical additive; FIG. 7 an example using no classifier; FIG. 8 an example using no chemical additive; and FIG. 9 an example of ordinary operation using both a classifier and a chemical additive.

The weight average molecular weight $Mw_{Homo}$ of the propylene homopolymer portion in a propylene block copolymer can be calculated as follows.

Assumed Conditions:

Polymerization process: bulk polymerization

Assumed conditions:
Weight average molecular weight is controlled by the hydrogen concentration in the liquid phase and the residence time in propylene (the hydrogen concentration in the liquid phase is assumed by equation 16).

$$Mw_{Homo} = \quad \text{Equation 15}$$

$$1 / \left( \begin{array}{c} 1.0968 \times 10^{-6} + 4.2083 \times 10^{-4}[H_2]_L - 6.822 \times 10^{-3}[H_2]_L^2 - \\ 0.34481[H_2]_L^3 + 13.02244[H_2]_L^4 \end{array} \right) -$$

$$21333 \cdot T_{Homo}$$

wherein;

$[H_2]_L$: hydrogen concentration in liquid phase [mol/mol]

$T_{Homo}$: residence time in propylene [hr]

$$[H_2]_L = 0.00011 - 0.34833[H_2]_G + 0.1352[H_2]_G^2 + 0.00643 [H_2]_G \cdot \text{Temp} \quad \text{Equation 16}$$

wherein;

$[H_2]_G$: hydrogen concentration in gas phase [mol/mol]

Temp: temperature (° C.)

The weight average molecular weight ($Mw_{cpr}$) of the ethylene-propylene copolymer portion in the propylene block copolymer can be calculated as follows.

$$Mw_{cpr} = 10^4(3.8236 \text{EXP}(-0.08273[H_2]_G + 2.98593) - 0.1964[P]_G 6.0 T_{Homo} + 9.0) \quad \text{Equation 17}$$

wherein;

$[H_2]_G$: hydrogen concentration in gas phase [mol %]

$T_{Homo}$: residence time in propylene homopolymer portion [hr]

$[P]_G$: propylene concentration in copolymer [mol %]

The propylene concentration in the ethylene-propylene copolymer portion (EPR) of the propylene block copolymer can be calculated as follows.

Assumed conditions: Copolymerization can be expressed by Mayo-Lewis' equation.

$$\frac{d([P])_p}{d([E])_p} = \frac{([P])_M}{([E])_M} \cdot \frac{\gamma_1 [P]_M + ([E])_M}{[P] + \gamma_2 [E]_M} \quad \text{Equation 18}$$

wherein;

$[P]_E$: propylene concentration in EPR [mol %]

$[E]_E$: ethylene concentration in EPR [mol %]

$[P]_M$: propylene concentration in copolymerizable monomers [mol %]

$[E]_M$: ethylene concentration in copolymerizable monomers [mol %]

γ1: reaction ratio of propylene (−)

γ2: reaction ratio of ethylene (−)

The above equation is converted to express $[P]_{EPR}$ (wt %) by $[P]_G$.

$$([P])_{EPR} = \frac{4200[P]_c(\gamma_1[P]_c + 100 - ([P])_c}{\left( \begin{array}{c} 42\gamma_1[P]_c^2 + 28\gamma_2[P]_c^2 - 70[P]_c^2 + \\ 7000[P]_c - 5600\gamma_2[P]_c + 28000\gamma_2 \end{array} \right)} \quad \text{Equation 19}$$

wherein;

$[P]_{EPR}$: propylene concentration in EPR [wt %]

$[P]_G$: propylene concentration in gas phase of copolymerizable monomers [mol %]

An example of computed values as obtained by using equations 1 to 9 is shown below in comparison with found values. The operating conditions were as follows.

Catalyst: mean particle diameter=10μ; term n in Rosin-Rammler's equation=8

Former polymerization conditions: 70° C. in polymerization temperature, 1 hour in residence time Latter polymerization conditions: 70° C. in polymerization temperature, 1 hour in residence time Average concentration of copolymer: 18.5% (comonomer: ethylene)

In case where a classifier was not used and no chemical additive was fed in the latter polymerization stage, the computation proved that the copolymer concentration is distributed extremely broadly, which agreed with the found values. The number of gel particles per 250 cm² was 1900 as computed, which was in good agreement with the found value, 2000, In case where a classifier was not used but a chemical additive was fed to the latter polymerization stage, the number of gel particles was 1200, while the found value was 1000 or greater.

Where a classifier was used but no chemical additive was added in the latter polymerization stage, the number of gel particles was 400, which was in good agreement with the found value, 500.

Industrial Applicability

According to the invention, there is provided an easy method for quantitatively estimating the gel content of a propylene block copolymer to be produced based on assumed production conditions without requiring a great deal of time and labor as needed in conventional methods.

What is claimed is:

1. A method for estimating a gel content of a propylene block copolymer obtained by a process for continuously manufacturing a propylene block copolymer by use of a polymerization apparatus having a former polymerization stage in which propylene is polymerized substantially alone in the presence of a solid catalyst component and a latter polymerization stage in which propylene is copolymerized with other α-olefin(s) in the presence of the polymer produced in the former polymerization stage, comprising; computing a distribution of the rubber component concentration in the block copolymer particles to be produced based on the operating conditions of the polymerization apparatus, a growth model equation of polymer particles on the solid catalyst component, and a residence time distribution of polymer particles in the former and latter polymerization stages; and estimating the gel content of the block copolymer based on the resulting computation.

2. A method for estimating a gel content of a propylene block copolymer obtained by a process for manufacturing a propylene block copolymer by use of a polymerization apparatus having a former polymerization stage, a classification stage, and a latter polymerization stage, the process comprising polymerizing propylene substantially alone in the presence of a solid catalyst component in the former polymerization stage, classifying the resulting polymer particles in the classification stage, transferring those particles having a large size to the latter polymerization stage, and continuously copolymerizing propylene and other α-olefin(s) in the presence of the polymer particles produced in the former polymerization stage in the latter polymerization stage, the method being characterized by comprising: computing a distribution of the rubber component concentration in the block copolymer particles to be produced based on the operating conditions of the polymerization apparatus, a growth model equation of polymer particles on the solid catalyst component, and a residence time distribution of polymer particles in the former and latter polymerization stages; and estimating the gel content of the block copolymer based on the resulting computation.

3. A method according to claim 1 or 2, comprising; computing the proportion of block copolymer particles having a rubber component concentration of 50% by weight or more in the total block copolymer particles and estimating the gel content of the block copolymer based on the resulting computation.

* * * * *